(No Model.)

T. B. ELLIS.
FIFTH WHEEL FOR VEHICLES.

No. 259,117. Patented June 6, 1882.

Attest.
Sidney P. Hollingsworth.
Walter S. Dodge.

Inventor.
T. B. Ellis
By his Atty.
P. T. Dodge.

UNITED STATES PATENT OFFICE.

THOMAS B. ELLIS, OF DAYTON, WISCONSIN.

FIFTH-WHEEL FOR VEHICLES.

SPECIFICATION forming part of Letters Patent No. 259,117, dated June 6, 1882.

Application filed February 7, 1882. (No model.)

*To all whom it may concern:*

Be it known that I, THOMAS B. ELLIS, of Dayton, in the county of Green and State of Wisconsin, have invented certain Improvements in Wheeled Vehicles, of which the following is a specification.

This invention relates to wagons and other wheeled vehicles in which the forward wheels are mounted upon a swiveling axle or truck, and is designed to give the axle an easy swiveling action when the vehicle is subjected to heavy loads.

To this end it consists in introducing between the axle and the frame rollers having vertical axes, said rollers arranged to co-operate with plates above and below, as hereinafter explained.

Figure 1:
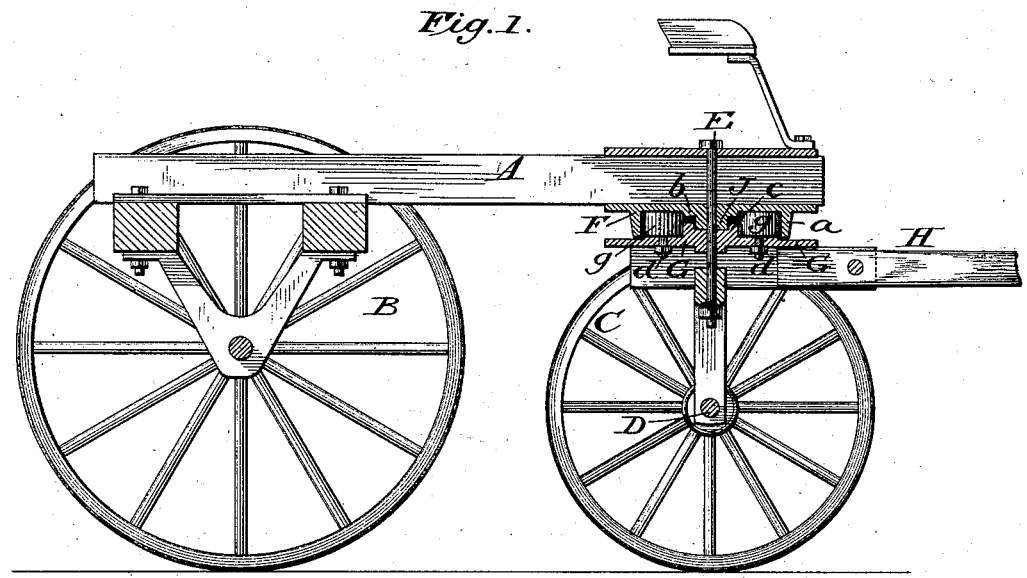
Figure 2:
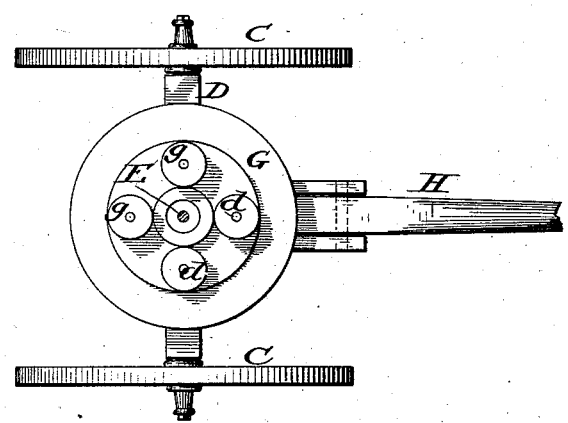

Referring to the accompanying drawings, Figure 1 is a longitudinal vertical section of a vehicle embracing my improvement. Fig. 2 is a top plan view of the forward truck.

A represents the frame of the vehicle, sustained at its rear end by wheels B and at its forward by wheels C, the latter being mounted upon the ends of an axle, D, connected to the under side of the main frame by means of a vertical king-bolt, E. On the under side of the frame A there is securely attached a horizontal plate, F, having a depending circular flange, *a*, and also a depending central hub, *b*, of circular form, the hub and the flange being concentric with the king-bolt. Upon the upper side of the truck or axle there is securely bolted a horizontal plate, G, having at its center a raised hub, *c*, concentric with the king-bolt. Between the two plates there is mounted a series of rollers, *g*, arranged to revolve on vertical studs or pins *d*, secured to the lower plate, as plainly represented in both figures. The rollers are of such form and size as to bear against the side of the depending flange *a*, and also against the periphery of the two central hubs, *b c*, as represented in Fig. 1, the arrangement being such that the rollers receive little or none of the weight of the frame. It is preferred to construct the upper plate, F, with a central hub, J, extending downward into or upon the lower plate, G, to bear the weight of the frame. A draft-pull, thills, or equivalent draft device, H, will be secured to the lower plate, G, or the axle D. The rollers, inserted as above described, serve to transmit the forward strain or draft from the tongue and plate G, through the plate F, to the frame of the vehicle. When the vehicle is heavily loaded, it will be found that the rollers enable the forward head to turn readily and easily, and that they prevent the dangers which ordinarily exist of the king-bolt being sprung and the forward truck binding and cramping in such manner as to turn with difficulty.

I am aware that in the fifth-wheel of a vehicle two plates have been provided with annular grooves of semicircular cross-section to receive balls placed between them. I am also aware that in a fifth-wheel conical rolls have been arranged to travel in an annular track or rail. I do not claim either of said arrangements, my invention being restricted to an apparatus wherein rolls of circular form are arranged with their axes in vertical lines, in combination with the upper and lower plates having an annular flange against which the faces of the rolls are supported. My arrangement is particularly designed to withstand the draft or pulling strain exerted in moving the vehicle. It will be observed that when rolls of cylindrical form are arranged as described the draft has no tendency to rock or tip them out of position or to separate the two plates, as is the case when balls are used.

Having thus described my invention, what I claim is—

1. In a fifth-wheel, the combination of the frame, the plate F, provided with the depending annular flange, the plate G, having the central cylindrical hub, and the intermediate cylindrical rolls, *g*, having their axes arranged in a vertical position and their surfaces arranged to travel around the flange and the hub on the respective plates.

2. In a vehicle, the combination of the main frame and its flanged plate F, the truck and its plate G, having a central hub, and the vertical cylindrical rolls mounted between the plates in the manner described and shown, and connected to the main plate by the pivots *d*, as shown.

3. The combination of the plate F, provided with the depending flange *a*, and the central depending stud, J, the plate G, provided with the central recess, c, the cylindrical vertical rollers g, located between said plates, and the king-bolt E.

4. The combination of the plates F and G, constructed as described, and the vertical cylindrical rolls arranged to bear within the flange a, the hub b of the upper plate, and also against the hub c of the lower plate.

THOMAS B. ELLIS.

Witnesses:
P. T. DODGE,
ROBT. L. MILLER.